United States Patent
Sumerlin et al.

(10) Patent No.: US 11,001,675 B2
(45) Date of Patent: May 11, 2021

(54) BORONIC ACID MONOMERS AND METHODS OF MAKING BORONIC ACID MONOMERS

(71) Applicant: University of Florida Research Foundation, Inc., Gainesville, FL (US)

(72) Inventors: Brent S. Sumerlin, Gainesville, FL (US); William L. A. Brooks, Jacksonville, FL (US); Christopher Deng, Goleta, CA (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 21 days.

(21) Appl. No.: 16/551,827

(22) Filed: Aug. 27, 2019

(65) Prior Publication Data

US 2020/0071466 A1    Mar. 5, 2020

Related U.S. Application Data

(60) Provisional application No. 62/723,569, filed on Aug. 28, 2018.

(51) Int. Cl.
*C08G 79/08* (2006.01)
*C08L 85/04* (2006.01)
*C07F 5/02* (2006.01)

(52) U.S. Cl.
CPC .............. *C08G 79/08* (2013.01); *C07F 5/025* (2013.01); *C08L 85/04* (2013.01)

(58) Field of Classification Search
CPC . C08G 79/08; C08L 85/04; C07F 5/02; C07F 5/025; C07F 5/04
See application file for complete search history.

(56) References Cited

U.S. PATENT DOCUMENTS

| | | |
|---|---|---|
| 5,108,502 A | 4/1992 | Pawlowski et al. |
| 7,767,817 B2 | 8/2010 | Wang et al. |
| 8,476,461 B2 | 7/2013 | Ulrich et al. |
| 8,708,045 B2 | 4/2014 | Ogle et al. |
| 2012/0329882 A1 | 12/2012 | Messersmith et al. |

FOREIGN PATENT DOCUMENTS

CN    103865289    6/2014

OTHER PUBLICATIONS

Christian Lubke et al., "Imprinted Polymers Prepared with Stoichiometric Template-Monomer Complexes: Efficient Binding of Ampicillin from Aqueous Solutions," 33 Macromolecules 5098 (2000). (Year: 2000).*
Xiaoping Yang et al., "Designed Boronate Ligands for Glucose-Selective Holographic Sensors," 12 Chem. Eur. J. 8491 (2006). (Year: 2006).*
Francois D'Hooge et al., "Polymerisation Resistant Synthesis of Methylacrylamido Phenylboronic Acids," 49 Polymer 3362 (2008). (Year: 2008).*
Christopher C. Deng et al., "Boronic Acid-Based Hydrogels Undergo Self-Healing at Neutral and Acidic pH," 4 ACS Macro Lett. 220 (2015). (Year: 2015).*
Supporting Information for Christopher C. Deng et al., "Boronic Acid-Based Hydrogels Undergo Self-Healing at Neutral and Acidic pH," 4 ACS Macro Lett. 220 (2015), 15 pages. (Year: 2015).*
English translation of the Abstract of Chinese Application No. CN103865289, one page.
Yang, et al. "A Novel Type of Fluorescent Boronic Acid That Shows Large Fluorescence Intensity Changes Upon Binding with a Carbohydrate in Aqueous Solution at Physiological pH", Department of Chemistry, North Carolina State University, Raleigh, NC 27695-8204, USA, Bioorganic & Medicinal Chemistry Letters 13 (2003) 1019-1022.

* cited by examiner

*Primary Examiner* — Nicholas E Hill
(74) *Attorney, Agent, or Firm* — Thomas Horstemeyer, LLP

(57) ABSTRACT

Boronic acid monomers, methods of making boronic acid monomer, and the like, are provided. Embodiments of the present disclosure are advantageous in that the boronic acid monomers are water soluble at a neutral pH, which is uncommon for boronic acids. As a result, the boronic acid monomers can be used in aqueous polymerization reactions with other hydrophilic monomers to yield polymers including boronic acids and esters.

6 Claims, No Drawings

BORONIC ACID MONOMERS AND METHODS OF MAKING BORONIC ACID MONOMERS

CLAIM OF PRIORITY TO RELATED APPLICATION

This application claims priority to U.S. provisional application entitled "BORONIC ACID MONOMERS AND METHODS OF MAKING BORONIC ACID MONOMERS" having Ser. No. 62/723,569 filed on Aug. 28, 2018, which is entirely incorporated herein by reference.

STATEMENT REGARDING FEDERALLY SPONSORED RESEARCH OR DEVELOPMENT

This invention was made with government support under DMR1410223 awarded by the National Science Foundation. The government has certain rights in the invention.

BACKGROUND

Compounds including boronic acid have been found to be useful in many areas based on their unique and versatile reactivity as well as their stability. Some areas in which compounds including boronic acid have been found useful include acid catalysis, metal-catalysis, molecular sensing, and biomedical applications, to name but a few.

SUMMARY

Embodiments of the present disclosure provide for boronic acid monomers, methods of making a boronic acid monomer, and the like. In an embodiment, the present disclosure provides for a composition comprising: a monomer selected from one of the following:

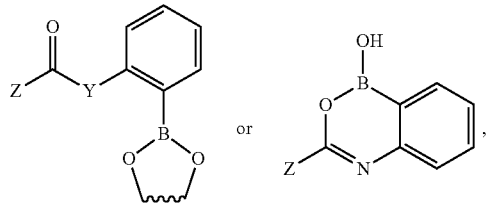

wherein Y is O, NH, or N(alkyl) and wherein Z is a polymerizable group. The polymerizable group can be selected from: an acrylamide group, a methacrylamide group, an acrylate group, a methacrylate group, a styrenic group, N-carboxyanhydride group, a N-thiocarboxyanhydride group, an alkenyl group, a norbornene group, or an oxynorbornene group.

In an embodiment, the present disclosure provides for a method of making a monomer, comprising:

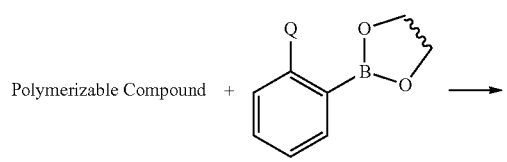

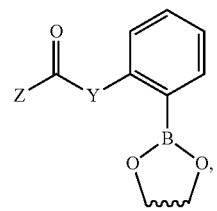

wherein Y is O, NH, or N(alkyl), wherein Q is OH, $NH_2$, or NH(alkyl), and wherein Z is a polymerizable group.

In an embodiment, the present disclosure provides for a method of making a monomer, comprising:

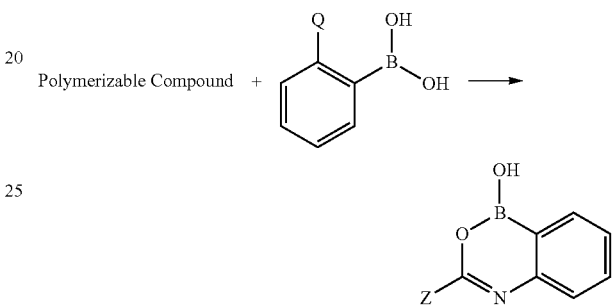

wherein Y is O, NH, or N(alkyl), wherein Q is OH, $NH_2$, or NH(alkyl), and wherein Z is a polymerizable group.

In an embodiment, the present disclosure provides for a monomer, comprising:

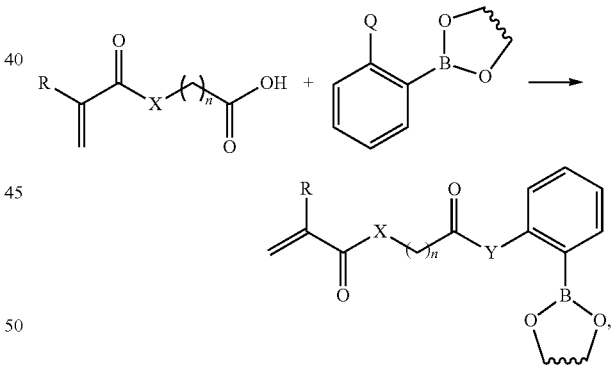

wherein R is H or an alkyl group, wherein X is O, NH, or N(alkyl), wherein Y is O, NH, or N(alkyl), wherein Q is OH, $NH_2$, or NH(alkyl), and n is 1 to 4.

In an embodiment, the present disclosure provides for a method of making a monomer, comprising:

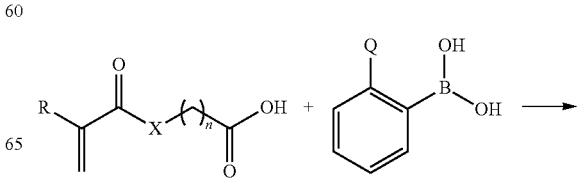

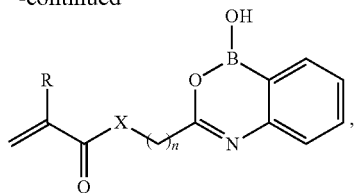

wherein R is H or an alkyl group, wherein X is O, NH, or N(alkyl), wherein Y is O, NH, or N(alkyl), wherein Q is OH, $NH_2$, or NH(alkyl), and n is 1 to 4.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of electrochemistry, analytical chemistry, polymer chemistry, material science, and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of microbiology, molecular biology, medicinal chemistry, and/or organic chemistry. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Definitions:

The term "substituted" refers to any one or more hydrogens on the designated atom that can be replaced with a selection from the indicated group, provided that the designated atom's normal valence is not exceeded, and that the substitution results in a stable compound.

The term "aliphatic group" refers to a saturated or unsaturated, linear or branched, substituted or unsubstituted hydrocarbon group and encompasses alkyl, alkenyl, and alkynyl groups, for example.

As used herein, "alkyl" or "alkyl group" refers to a saturated aliphatic hydrocarbon radical which can be straight or branched and/or substituted or unsubstituted, having 1 to 20 carbon atoms, wherein the stated range of carbon atoms includes each intervening integer individually, as well as sub-ranges (e.g., C1 to C6, C1 to C4, and the like). Examples of alkyl include, but are not limited to methyl, ethyl, n-propyl, iso-propyl, n-butyl, sec-butyl, tert-butyl, n-pentyl, and sec-pentyl, and the like.

As used herein, "alkenyl" or "alkenyl group" refers to an aliphatic hydrocarbon radical which can be straight or branched and/or substituted or unsubstituted, containing at least one carbon-carbon double bond, having 2 to 20 carbon atoms, wherein the stated range of carbon atoms includes each intervening integer individually, as well as sub-ranges (e.g., C1 to C6, C1 to C4, and the like). Examples of alkenyl groups include, but are not limited to, ethenyl, propenyl, n-butenyl, iso-butenyl, 3-methylbut-2-enyl, n-pentenyl, heptenyl, octenyl, decenyl, and the like.

The term "substituted," as in "substituted alkyl" and the like means that the substituted group may contain in place of one or more hydrogens a group such as halogen or hydroxy. In an embodiment, "substituted" includes the substituted group may contain in place of one or more hydrogens a group such as halogen or an alkyl group (e.g., a linear or branched C1 to C4 moiety).

As used herein, "halo", "halogen", or "halogen radical" refers to a fluorine, chlorine, bromine, and iodine, and radicals thereof. Further, when used in compound words, such as "haloalkyl" or "haloalkenyl", "halo" refers to an alkyl or alkenyl radical in which one or more hydrogens are substituted by halogen radicals. Examples of haloalkyl include, but are not limited to, trifluoromethyl, trichloromethyl, pentafluoroethyl, and pentachloroethyl.

Discussion:

Embodiments of the present disclosure provide for boronic acid monomers, methods of making a boronic acid monomer, and the like. Embodiments of the present disclosure are advantageous in that the boronic acid monomers are water soluble at a neutral pH (e.g., a physiological pH of about 7.4), which is uncommon for boronic acids. As a result, the boronic acid monomers can be used in aqueous polymerization reactions with other hydrophilic monomers to yield polymers including boronic acids and esters, which can be used in numerous applications such as physiological applications (e.g., enzymatic inhibitor, drug delivery, and so on), sensing (e.g., for saccharides), protein conjugation (e.g., for immobilization to glycoproteins), hydrogels, and the like.

In an aspect, the boronic acid monomer can have one of the following structures:

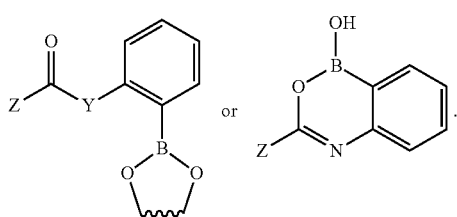

In an aspect, Y can be O, NH, or N(alkyl). In aspects, the alkyl group (e.g., independently for R and N(alkyl) (X and/or Y) can be a C1 to C6 alkyl group, a C1 to C3 alkyl group, or a C1 alkyl group. In an embodiment, Z can be a polymerizable group. The polymerizable group can be: an acrylamide group, a methacrylamide group, an acrylate group, a methacrylate group, a styrenic group, N-carboxyanhydride group, a N-thiocarboxyanhydride group, an alkenyl group, a norbornene group, or an oxynorbornene group. Each of the boronic acid monomers described above and herein are water soluble at a neutral pH (e.g., about 7.2 to 7.6) and in particular, at a physiological pH of about 7.4. This is advantageous in aqueous polymerization reactions with other hydrophilic monomers.

In an embodiment, the boronic acid monomer can have one of the following structures:

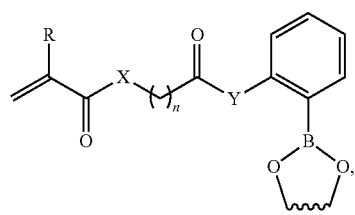

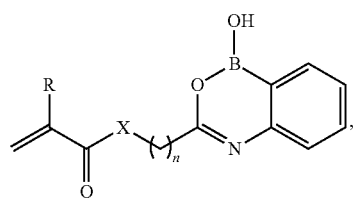

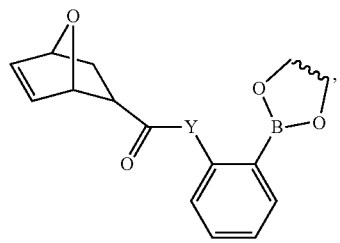

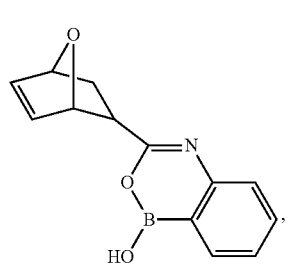

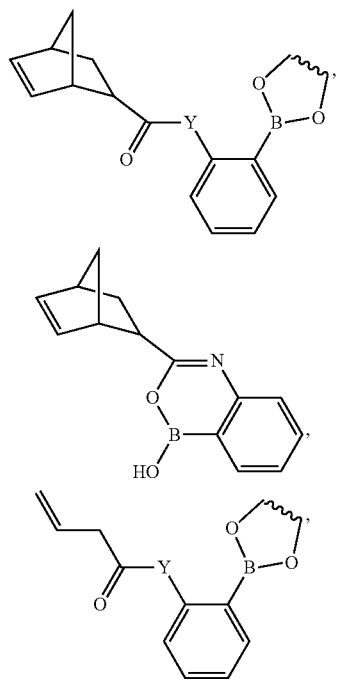

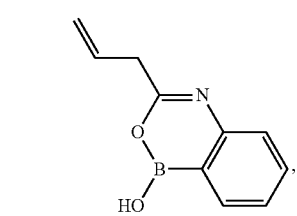

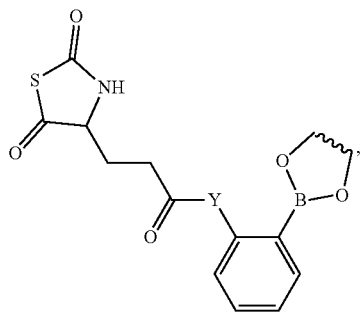

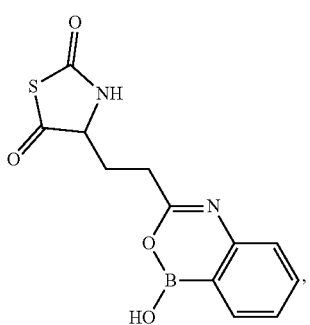

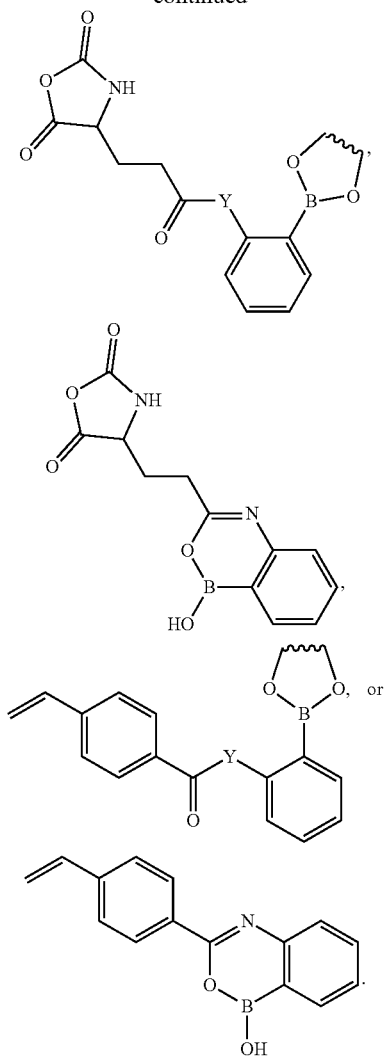

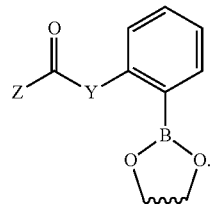

These compounds can be water soluble at a neutral pH of about 7.2 to 7.6 or about 7.4. In an aspect, R can be H or an alkyl group. In an embodiment, X can be O, NH, or N(alkyl). In an embodiment, Y can be O, NH, or N(alkyl). In an embodiment, Z can be OH, $NH_2$, or a polymerizable group, while n is 0 to 4 or 1 to 4. In aspects, the alkyl group (e.g., independently for R and N(alkyl) (X and/or Y) can be a C1 to C6 alkyl group, a C1 to C3 alkyl group, or a C1 alkyl group. In an aspect, R can be H or a methyl group. In an embodiment, the polymerizable group can be: a styrenic group, N-carboxyanhydride group, a N-thiocarboxyanhydride group, an alkenyl group, a norbornene group, or an oxanorbornene group.

In aspects, the boronic acid monomer can be made using the following reaction scheme:

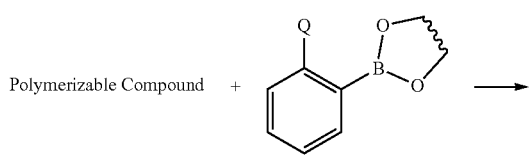

In an embodiment, Y can be O, NH, or N(alkyl). In an embodiment, Q can be OH, $NH_2$, or NH(alkyl). In an aspect, the alkyl group for Y and/or Q can independently be can be a C1 to C6 alkyl group, a C1 to C3 alkyl group, or a C1 alkyl group. In an embodiment, Z can be a polymerizable group. In an embodiment, the polymerizable group can be: an acrylamide group, a methacrylamide group, an acrylate group, a methacrylate group, a styrenic group, N-carboxyanhydride group, a N-thiocarboxyanhydride group, an alkenyl group, a norbornene group, or an oxanorbornene group, while the polymerizable compound is the compound from which the polymerizable group is derived (e.g., via removal of a H). In particular, the polymerizable compound can be a styrenic compound, N-carboxyanhydride compound, a N-thiocarboxyanhydride compound, an alkenyl compound, a norbornene compound, or an oxynorbornene compound. In an embodiment, the polymerization can be initiated using photo-initiation, thermal initiators (e.g., azo compounds, peroxides, and the like), redox initiators (e.g., ammonium persulfate with tetramethylethylenediamine, and the like), suitable nucleophiles (e.g., butyl lithium, alkoxides, or other anionic initiators), or metathesis catalysts (e.g., catalyst based on transition metals such as W, Mo, Re, Ru, and Ti). In an embodiment, the pH can be about 4 to 11 and the temperature can be about 0 to about 110° C. for the polymerization.

In a particular embodiment, the boronic acid monomer can be made using the following reaction scheme:

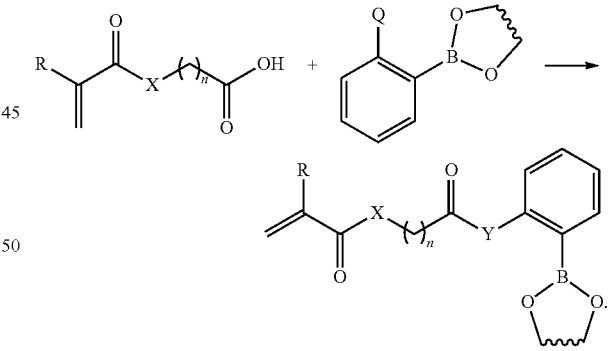

In an embodiment, R can be H or an alkyl group. In an embodiment, X can be O, NH, or N(alkyl). In an embodiment, Y can be O, NH, or N(alkyl). In an embodiment, Q can be OH, $NH_2$, or NH(alkyl), while n is 0 to 4 or 1 to 4. In an aspect, the alkyl group for R, X, Y and/or Q can independently be can be a C1 to C6 alkyl group, a C1 to C3 alkyl group, or a C1 alkyl group. In an embodiment, R can be H or a methyl group. In an embodiment, the polymerization can be initiated using photo-initiation, thermal initiators, or redox initiators. In an embodiment, the pH can be about 4 to 11 and the temperature can be about 0 to about 100° C. for the polymerization.

In an embodiment, the boronic acid monomer can be made using the following reaction scheme:

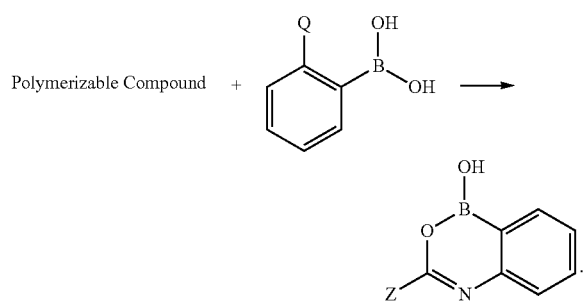

In an embodiment, Q can be OH, NH$_2$, or NH(alkyl). In an aspect, the alkyl group for Q can independently be can be a C1 to C6 alkyl group, a C1 to C3 alkyl group, or a C1 alkyl group. In an embodiment, Z can be a polymerizable group. In an embodiment, the polymerizable group can be: an acrylamide group, a methacrylamide group, an acrylate group, a methacrylate group, a styrenic group, N-carboxyanhydride group, a N-thiocarboxyanhydride group, an alkenyl group, a norbornene group, or an oxynorbornene group, while the polymerizable compound is the compound from which the polymerizable group is derived (e.g., via removal of a H). In particular, the polymerizable compound can be a styrenic compound, N-carboxyanhydride compound, a N-thiocarboxyanhydride compound, an alkenyl compound, a norbornene compound, or an oxynorbornene compound. In an embodiment, the polymerization can be initiated using photo-initiation, thermal initiators, or redox initiators. In an embodiment, the pH can be about 4 to 11 and the temperature can be about 0 to about 110° C. for the polymerization.

In a particular embodiment, the boronic acid monomer can be made using the following reaction scheme:

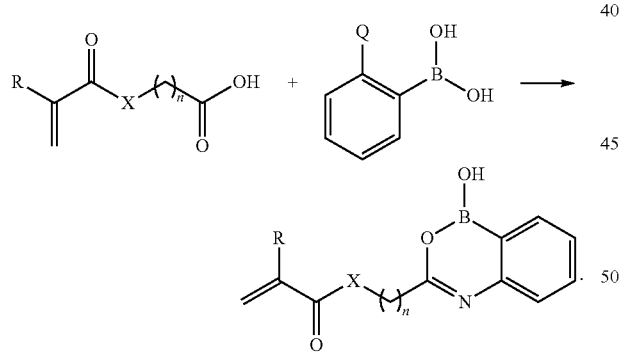

In an embodiment, R can be H or an alkyl group. In an embodiment, X can be O, NH, or N(alkyl). In an embodiment, Q can be OH, NH$_2$, or NH(alkyl), while n is 1 to 4. In an aspect, the alkyl group for R, X, Y and/or Q can independently be can be a C1 to C6 alkyl group, a C1 to C3 alkyl group, or a C1 alkyl group. In an embodiment, R can be H or a methyl group. In an embodiment, the polymerization can be initiated using photo-initiation. In an embodiment, the pH can be about 4 to 11 and the temperature can be about 0 to about 110° C. for the polymerization.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A composition comprising: a monomer:

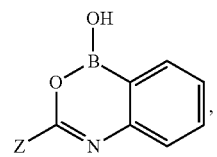

wherein Z is a polymerizable group, wherein the polymerizable group is selected from: an acrylamide group, a methacrylamide group, an acrylate group, a methacrylate group, N-carboxyanhydride group, a N-thiocarboxyanhydride group, a norbornene group, or an oxynorbornene group.

2. The composition of claim 1, wherein the monomer is selected from the following:

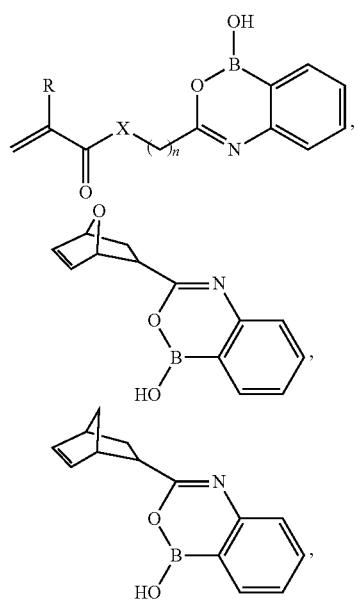

-continued

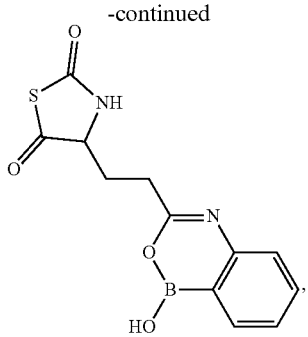

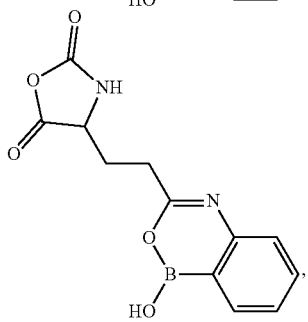

wherein R is H or an alkyl group, wherein X is O, NH, or N(alkyl), and n is 0 to 4.

3. The composition of claim 1, wherein the monomer is:

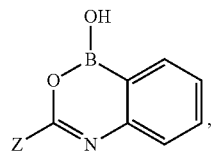

wherein the polymerizable group is selected from: an acrylamide group, a methacrylamide group, an acrylate group, or a methacrylate group.

4. The composition of claim 1, wherein the monomer is:

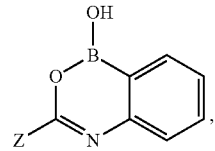

wherein the polymerizable group is selected from: N-carboxyanhydride group or a N-thiocarboxyanhydride group.

5. The composition of claim 1, wherein the monomer is:

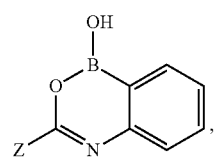

wherein the polymerizable group is selected from: a norbornene group, or an oxynorbornene group.

6. A composition comprising: a monomer:

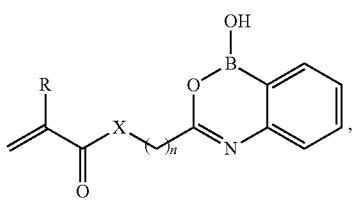

wherein R is H or an alkyl group, wherein X is O, NH, or N(alkyl), and n is 0 to 4.

* * * * *